(12) United States Patent
Hakoda et al.

(10) Patent No.: US 9,361,840 B2
(45) Date of Patent: Jun. 7, 2016

(54) DISPLAY DEVICE

(71) Applicant: Panasonic Liquid Crystal Display Co., Ltd., Himeji-shi, Hyogo (JP)

(72) Inventors: Hidetaka Hakoda, Hyogo (JP); Yuuta Funahashi, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 82 days.

(21) Appl. No.: 14/200,031

(22) Filed: Mar. 7, 2014

(65) Prior Publication Data

US 2014/0375697 A1 Dec. 25, 2014

(30) Foreign Application Priority Data

Jun. 24, 2013 (JP) ................... 2013-132129

(51) Int. Cl.
*G09G 3/36* (2006.01)
*G02F 1/1345* (2006.01)

(52) U.S. Cl.
CPC .......... *G09G 3/3648* (2013.01); *G02F 1/13452* (2013.01); *G09G 3/3607* (2013.01); *G09G 2300/0426* (2013.01); *G09G 2320/0252* (2013.01); *G09G 2320/0285* (2013.01); *G09G 2340/16* (2013.01); *G09G 2360/16* (2013.01)

(58) Field of Classification Search
CPC . G09G 3/3607; G09G 3/3648; G09G 3/3611; G09G 2300/0452; G09G 2300/0426; G09G 2340/16; G09G 2360/16; G09G 2320/0285; G09G 2320/0252; G02F 1/1345; G02F 1/13452; G02F 1/13454; G02F 1/13458
See application file for complete search history.

(56) References Cited

U.S. PATENT DOCUMENTS

2006/0044504 A1 3/2006 Yamada et al.
2009/0273551 A1* 11/2009 Tung et al. ...................... 345/88
2010/0097551 A1* 4/2010 Yamagishi et al. ........... 349/115

FOREIGN PATENT DOCUMENTS

JP 2009-187026 A 8/2009

* cited by examiner

*Primary Examiner* — Aneeta Yodichkas
*Assistant Examiner* — Saifeldin Elnafia
(74) *Attorney, Agent, or Firm* — Hubbs, Enatsky & Inoue PLLC

(57) ABSTRACT

Provided is a display device, including: a drive circuit for inputting input signals generated based on video signals corresponding to at least red, green, and blue input from an exterior thereof; and a substrate including a plurality of connection wiring lines and a plurality of signal lines formed thereon, the plurality of connection wiring lines being connected to the drive circuit, the plurality of signal lines being provided in a display region, to which output signals output from the drive circuit are input through the plurality of connection wiring lines. The plurality of connection wiring lines supplied with the output signals corresponding to the respective colors are formed in layers different from each other corresponding to the respective colors on the substrate.

9 Claims, 9 Drawing Sheets

R SIGNAL LUT

| | | GRAY SCALE OF CURRENT FRAME | | | | |
|---|---|---|---|---|---|---|
| | | 0 | 64 | 128 | 192 | 255 |
| GRAY SCALE OF PRECEDING FRAME | 0 | 0 | 169 | 218 | 248 | 255 |
| | 64 | 0 | 64 | 165 | 231 | 255 |
| | 128 | 0 | 34 | 128 | 221 | 255 |
| | 192 | 0 | 15 | 102 | 192 | 255 |
| | 255 | 0 | 0 | 58 | 191 | 255 |

FIG.6

G SIGNAL LUT

| | | \multicolumn{5}{c}{GRAY SCALE OF CURRENT FRAME} |
|---|---|---|---|---|---|---|

| | | GRAY SCALE OF CURRENT FRAME | | | | |
|---|---|---|---|---|---|---|
| | | 0 | 64 | 128 | 192 | 255 |
| GRAY SCALE OF PRECEDING FRAME | 0 | 0 | 161 | 208 | 237 | 255 |
| | 64 | 0 | 64 | 157 | 220 | 255 |
| | 128 | 0 | 32 | 128 | 211 | 255 |
| | 192 | 0 | 16 | 97 | 192 | 255 |
| | 255 | 0 | 0 | 55 | 182 | 255 |

FIG.7

B SIGNAL LUT

| | | GRAY SCALE OF CURRENT FRAME | | | | |
|---|---|---|---|---|---|---|
| | | 0 | 64 | 128 | 192 | 255 |
| GRAY SCALE OF PRECEDING FRAME | 0 | 0 | 154 | 199 | 226 | 255 |
| | 64 | 0 | 64 | 150 | 210 | 255 |
| | 128 | 0 | 31 | 128 | 201 | 255 |
| | 192 | 0 | 14 | 93 | 192 | 255 |
| | 255 | 0 | 0 | 53 | 174 | 255 |

FIRST R SIGNAL LUT

|  |  | GRAY SCALE OF CURRENT FRAME | | | | |
|---|---|---|---|---|---|---|
|  |  | 0 | 64 | 128 | 192 | 255 |
| GRAY SCALE OF PRECEDING FRAME | 0 | 0 | 169 | 218 | 248 | 255 |
| | 64 | 0 | 64 | 165 | 231 | 255 |
| | 128 | 0 | 34 | 128 | 221 | 255 |
| | 192 | 0 | 15 | 102 | 192 | 255 |
| | 255 | 0 | 0 | 58 | 191 | 255 |

FIG.12

SECOND R SIGNAL LUT

|  |  | GRAY SCALE OF CURRENT FRAME | | | | |
|---|---|---|---|---|---|---|
|  |  | 0 | 64 | 128 | 192 | 255 |
| GRAY SCALE OF PRECEDING FRAME | 0 | 0 | 161 | 208 | 237 | 255 |
| | 64 | 0 | 64 | 157 | 220 | 255 |
| | 128 | 0 | 32 | 128 | 211 | 255 |
| | 192 | 0 | 16 | 97 | 192 | 255 |
| | 255 | 0 | 0 | 55 | 182 | 255 |

DISPLAY DEVICE

CROSS-REFERENCE TO RELATED APPLICATION

The present application claims priority from Japanese application JP 2013-132129 filed on Jun. 24, 2013, the content of which is hereby incorporated by reference into this application.

TECHNICAL FIELD

The present application relates to a display device, in particular, wirings provided outside a display region of a display panel.

BACKGROUND

In recent years, a display device has a smaller distance between neighboring wirings with definition enhancement and downsizing thereof. In particular, wirings electrically connected to signal lines formed in a display region are bundled into groups, each including a plurality of wirings, outside the display region. Then, the groups of the wirings are connected to a plurality of drive circuits. A direction of extension of the wirings is diagonal with respect to a direction of extension of the signal lines. As a result, the distance between the neighboring wirings becomes extremely small. The above-mentioned wiring is so-called diagonal wiring. The diagonal wiring has problems in that the neighboring wirings undesirably come into contact with each other and disconnection of the wiring occurs by thinning the wirings so as to avoid the contact between the wirings.

A technology for solving the problem described above is described in Japanese Patent Application Laid-open No. 2009-187026, for example. In a configuration described in Japanese Patent Application Laid-open No. 2009-187026, the neighboring wirings are formed in layers different from each other. In this manner, a distance between the neighboring wirings in the same layer is increased. As a result, the neighboring wirings can be prevented from coming into contact with each other.

SUMMARY

However, the configuration described in Japanese Patent Application Laid-open No. 2009-187026 has a problem in that display quality is lowered under the effects of a difference between wiring resistances due to a difference in layer structure between the wirings.

For example, as for a plurality of wirings provided outside the display region, in a case of a double-layer structure in which one of the neighboring wirings is formed in a lower layer and another of the neighboring wirings is formed in an upper layer, a resistance value at a contact portion which is electrically connected to the wiring in the lower layer and a resistance value at a contact portion which is electrically connected to the wiring in the upper layer differ from each other, depending on depths of contact holes. Therefore, when signals corresponding to red, green, and blue (RGB) are respectively supplied to the above-mentioned plurality of wirings, the wiring to be supplied with the R signal, the wiring to be supplied with the G signal, and the wiring to be supplied with the B signal are alternately formed in the upper layer and the lower layer. Therefore, the layer structures of the wirings corresponding to the respective colors differ from each other. In addition, the layer structure also differs between the wirings corresponding to the same color. As a result, a variation occurs in wiring resistance between the wirings. Therefore, a voltage applied to each pixel becomes different from a desired voltage. Thus, there arises a problem in that desired display quality cannot be obtained.

The present invention has been made in view of the problems described above, and has an object to provide a display device capable of preventing neighboring wirings from coming into contact with each other and preventing display quality from being lowered.

In one general aspect, the present application describes a display device that includes a drive circuit for inputting input signals generated based on video signals corresponding to at least red, green, and blue input from an exterior of the display device; and a substrate including a plurality of connection wiring lines and a plurality of signal lines formed thereon, the plurality of connection wiring lines being connected to the drive circuit, the plurality of signal lines being provided in a display region, to which output signals output from the drive circuit are input through the plurality of connection wiring lines. The plurality of connection wiring lines supplied with the output signals corresponding to the respective colors are formed in layers different from each other corresponding to the respective colors on the substrate.

The above general aspect may include one or more of the following features. An R layer in which the plurality of connection wiring lines to be supplied with the output signal corresponding to red may be formed, a G layer in which the plurality of connection wiring lines to be supplied with the output signal corresponding to green may be formed, and a B layer in which the plurality of connection wiring lines to be supplied with the output signal corresponding to blue may be formed. The R layer, the G layer, and the B layer may be laminated through insulating layers therebetween.

The plurality of signal lines may be respectively connected to the plurality of connection wiring lines via contact holes formed through the insulating layers.

The display device may further include correcting section for correcting the video signals in accordance with positions of layers in which the plurality of connection wiring lines to be supplied with the output signals corresponding to the respective colors are provided. Signals corrected by the correcting section may be input to the drive circuit as the input signals.

The correcting section may set a correction amount for the video signals larger when corresponding one of the positions of the layers in which corresponding ones of the plurality of connection wiring lines are provided is closer to the substrate.

In an another general aspect, the present application describes a display device that includes a drive circuit for inputting input signals generated based on video signals corresponding to at least red, green, and blue input from an exterior of the display device; and a substrate including a plurality of connection wiring lines and a plurality of signal lines formed thereon, the plurality of connection wiring lines being connected to the drive circuit, the plurality of signal lines being provided in a display region, to which output signals output from the drive circuit are input through the plurality of connection wiring lines. Neighboring two of the plurality of connection wiring lines are formed in layers different from each other on the substrate. The display device further comprises correcting section for correcting the video signals in accordance with positions of layers in which the plurality of connection wiring lines to be supplied with the output signals corresponding to the respective colors are provided. Signals corrected by the correcting section are input to the driving circuit as the input signals.

The above another general aspect may include one or more of the following features. The plurality of connection wiring lines corresponding to the respective colors may be classified as first connection wiring lines and second connection wiring lines to be formed in layers different from each other. The correcting section may set a correction amount for the video signals corresponding to the first connection wiring lines and a correction amount for the video signals corresponding to the second connection wiring lines different from each other.

The first connection wiring lines may be formed in a lower layer on a side closer to the substrate and the second connection wiring lines may be formed in an upper layer on the first connection wiring lines through an insulating layer therebetween. The plurality of connection wiring lines corresponding to red are classified as first R connection wiring lines formed in the lower layer and second R connection wiring lines formed in the upper layer. The plurality of connection wiring lines corresponding to green may be classified as first G connection wiring lines formed in the lower layer and second G connection wiring lines formed in the upper layer. The plurality of connection wiring lines corresponding to blue may be classified as first B connection wiring lines formed in the lower layer and second B connection wiring lines formed in the upper layer. The correcting section may set a correction amount for the video signals of red corresponding to the first R connection wiring lines larger than a correction amount for the video signals of red corresponding to the second R connection wiring lines, set a correction amount for the video signals of green corresponding to the first G connection wiring lines larger than a correction amount for the video signals of green corresponding to the second G connection wiring lines, and set a correction amount for the video signals of blue corresponding to the first B connection wiring lines larger than a correction amount for the video signals of blue corresponding to the second B connection wiring lines.

The correcting section may perform correction for enhancing a gray scale corresponding to each of the video signals.

DETAILED DESCRIPTION

Now, embodiments of the present application are described referring to the accompanying drawings. Although a liquid crystal display device is described as an example in the embodiments of the present application, a display device according to the present invention is not limited to the liquid crystal display device. The display device according to the present invention may also be, for example, an organic EL display device.

First Embodiment

Figure 1:
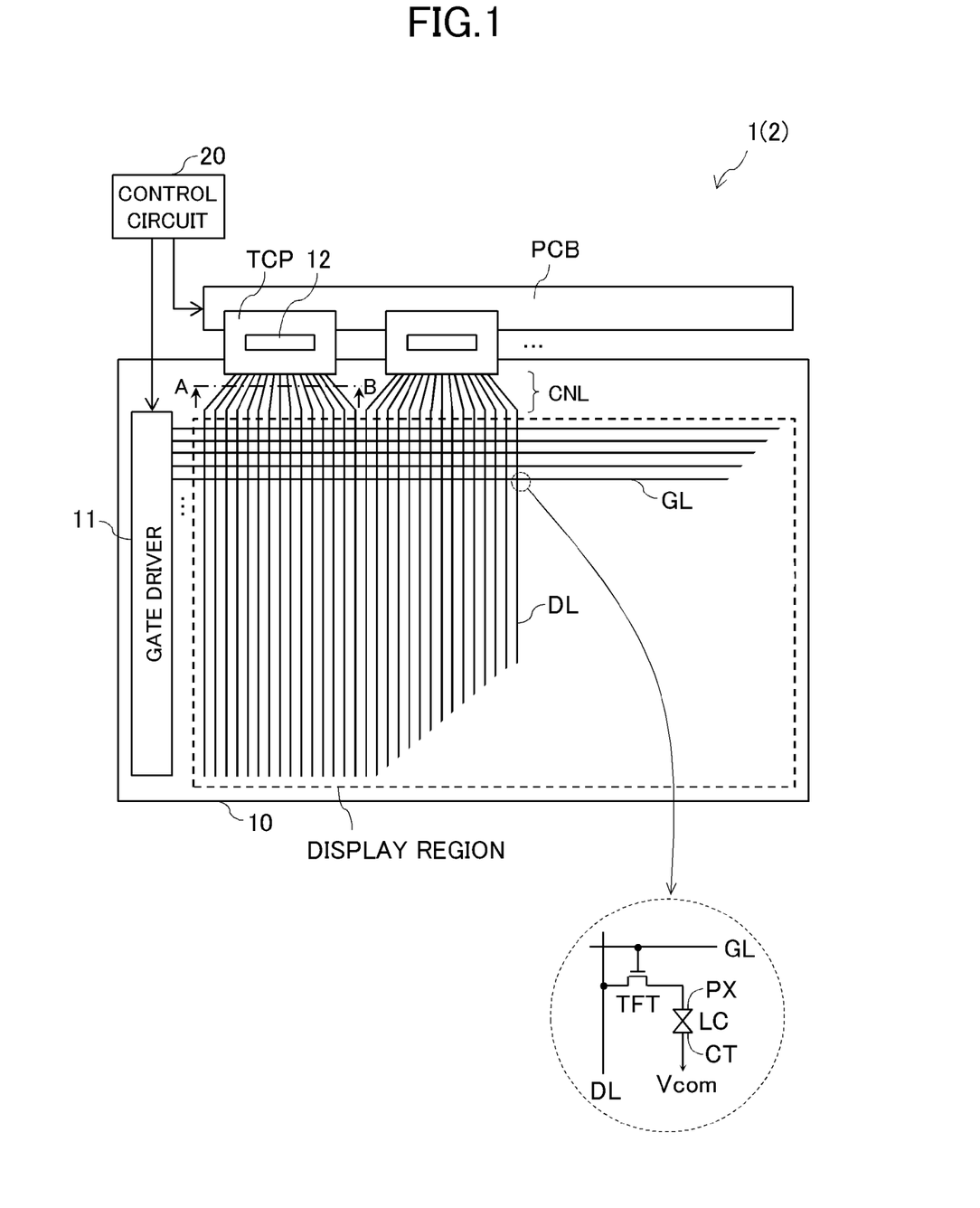
FIG. 1 is a plan view illustrating a schematic configuration of a liquid crystal display device according to a first embodiment of the present application.

FIG. 1 is a plan view illustrating a schematic configuration of a liquid crystal display device 1 according to a first embodiment of the present application. The liquid crystal display device 1 includes a display panel 10, drive circuits (a gate driver 11 and source drivers 12), a control circuit 20, and a backlight unit (not shown). The display panel 10 displays an image. The gate driver 11 and the source drivers 12 drive the display panel 10. The control circuit 20 controls the drive circuits. The backlight unit irradiates the display panel 10 with light from a back surface side.

The display panel 10 includes a plurality of gate lines GL1 to GLn extending in a row direction and a plurality of data lines DL1 to DLm extending in a column direction. Pixel regions are formed at intersections between the gate lines and the data lines. In a display region of the display panel 10, the plurality of pixel regions are arranged in the row direction and the column direction in a matrix pattern. The gate lines GL1 to GLn are connected to the gate driver 11, whereas the data lines DL1 to DLm are bundled into a plurality of groups, each including a plurality of the data lines. The groups of the data lines are respectively connected to the plurality of source drivers 12 through a plurality of connection wiring lines CNL.

RGB video signals (R signal, G signal, and B signal) corresponding to at least red (R), green (G), and blue (B) are input to the control circuit 20 from an external signal source (not shown). A horizontal synchronizing signal and a vertical synchronizing signal, which correspond to the video signal, and a control signal for controlling a display operation are also input to the control circuit 20. Based on the input signals described above, the control circuit 20 generates and outputs a data start pulse signal, a data clock signal, a gate start pulse signal, a gate clock signal, and a gate driver output control signal as signals for displaying an image represented by the video signals (R signals, G signals, and B signals) on the display panel 10 in addition to the video signals.

The gate driver 11 sequentially outputs gate signals (gate-ON voltage) to the gate lines GL1 to GLn based on the gate start pulse signal, the gate clock signal, and the gate driver output control signal, which are output from the control circuit 20. The gate driver 11 may be configured by connecting a plurality of driver circuits in cascade connection.

Each of the plurality of source drivers 12 is mounted in each tape carrier package TCP. A plurality of the tape carrier packages TCP are connected to a drive circuit board PCB. Various signals are supplied to each of the source drivers 12 from the control circuit 20 through the drive circuit board PCB and the corresponding tape carrier package TCP. Each of the plurality of data lines DL is connected to a corresponding one of the source drivers 12 through a connection wiring line CNL. The groups of data lines DL, which are formed by bundling the plurality of data lines DL, are connected respectively to the plurality of source drivers 12 through the corresponding connection wiring lines CNL.

For example, when the display panel 10 has a Wide Ultra Extended Graphics Array (WUXGA) resolution (1920 by 3 (RGB=5760 horizontal pixels and 1200 vertical pixels) and the number of the provided source drivers 12 is six, a total number of the data lines DL, that is, 5760 data lines are divided by 6. Therefore, 960 data lines DL are connected to each of the source drivers 12 through 960 connection wiring lines CNL. A data signal corresponding to any one of colors, that is, R, G, and B, is supplied to each of the data lines DL.

The plurality of data lines DL are formed in the display region so as to extend in the column direction. The connection wiring lines CNL electrically connect the corresponding data lines DL and terminal portions of the source drivers 12 to each other outside the display region. In this manner, each group of the plurality of data lines DL formed by bundling the plurality of data lines DL is connected to each of the source drivers 12 through the connection wiring lines CNL. Therefore, some of the connection wiring lines CNL are formed diagonally with respect to the direction in which the data lines DL extend. A specific configuration of the connection wiring lines CNL is described later.

Each of the source drivers 12 outputs data signals (gray-scale voltages; output signals) to the plurality of data lines DL corresponding to the source driver 12 based on the video signals (R signal, G signal, and B signal), the data start pulse signal, and the data clock signal, which are output from the control circuit 20.

In each of the pixel regions, active-matrix display is performed. Specifically, the gate signals are supplied from the gate driver 11 to the gate lines GL, whereas the data signals are supplied from the source drivers 12 to the data lines DL. When a thin-film transistor TFT connected to the gate line GL supplied with the gate signal is brought into an ON state, the data signal is supplied to a pixel electrode PX through the data line DL connected to the thin-film transistor TFT. A potential difference (voltage) between a potential of the data signal supplied to the pixel electrode PX and a common potential Vcom supplied from a common driver (not shown) to a common electrode CT is applied to a liquid crystal layer LC. In this manner, a transmittance of light is controlled to display an image. In order to prevent the voltage applied to the liquid crystal layer LC from being lowered, a storage capacitor may be formed in each of the pixel regions.

Figure 2:
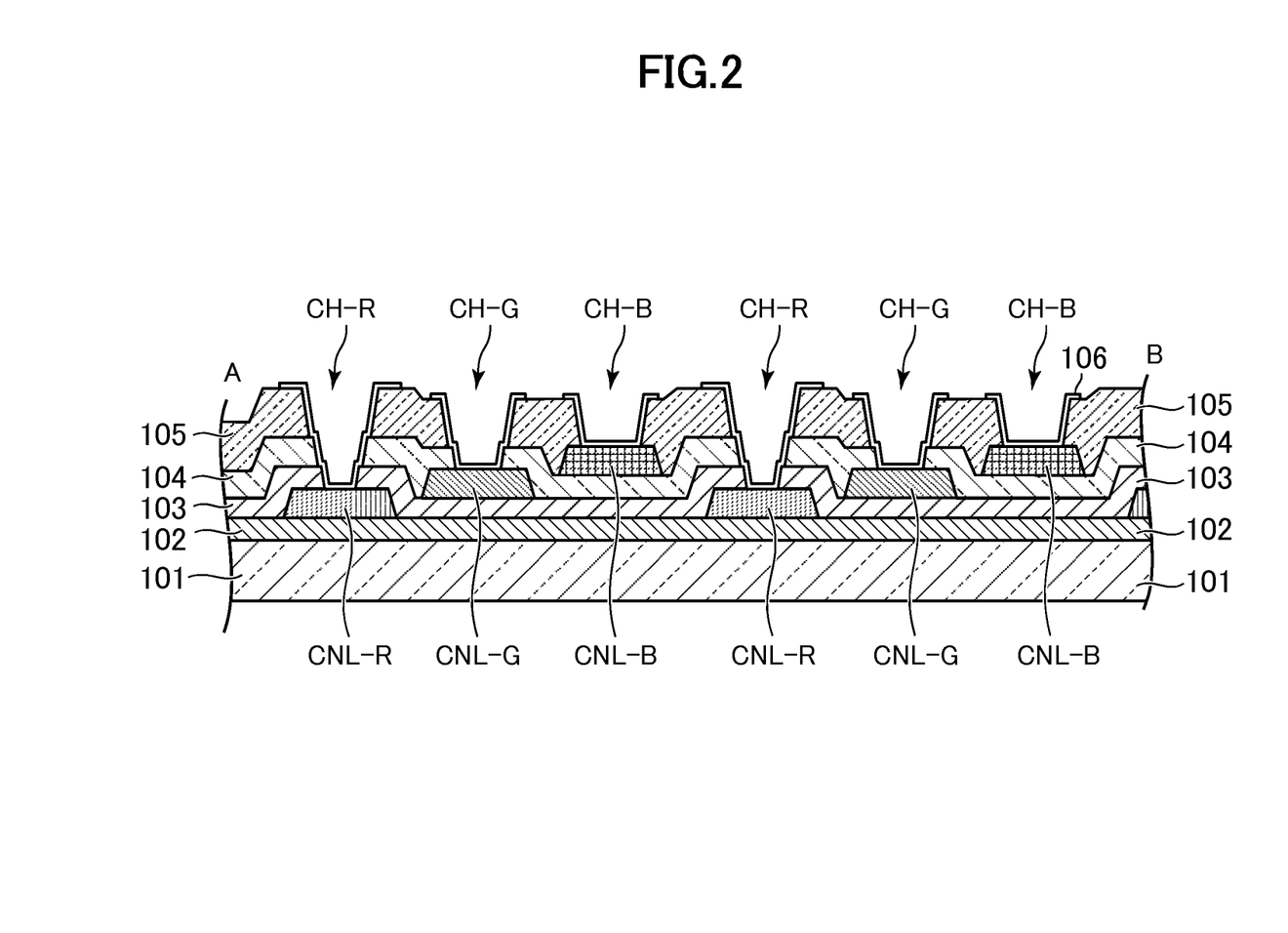
FIG. 2 is a diagram illustrating a part of a sectional structure of a display panel taken along the line A-B in FIG. 1.

A specific configuration of the connection wiring lines CNL is now described referring to FIG. 2. FIG. 2 illustrates a part of a sectional structure of the display panel 10 taken along the line A-B in FIG. 1. Here, the connection wiring line CNL and the data line DL, which are supplied with the data signal corresponding to the color R, are respectively referred to as an R connection wiring line CNL-R and an R data line DL-R, the connection wiring line CNL and the data line DL, which are supplied with the data signal corresponding to the color G, are respectively referred to as a G connection wiring line CNL-G and a G data line DL-G, and the connection wiring line CNL and the data line DL, which are supplied with the data signal corresponding to the color B, are respectively referred to as a B connection wiring line CNL-B and a B data line DL-B. In FIG. 2, the illustration of the R data line DL-R, the G data line DL-G, and the B data line DL-B, which are formed in the display region, is omitted.

As illustrated in FIG. 2, an insulating film (insulating layer) 102 is formed on a substrate 101 in the display panel 10. The R connection wiring lines CNL-R are formed on the insulating film 102. An insulating film (insulating layer) 103 is formed so as to cover the R connection wiring lines CNL-R. The G connection wiring lines CNL-G are formed on the insulating film 103. Moreover, an insulating film (insulating layer) 104 is formed so as to cover the G connection wiring lines CNL-G. The B connection wiring lines CNL-B are formed on the insulating film 104. Further, an insulating film (insulating layer) 105 is formed so as to cover the B connection wiring lines CNL-B.

Contact holes respectively reaching the connection wiring lines CNL are formed through the insulating films formed on the respective connection wiring lines CNL. A conductive film 106 is formed in each of the contact holes. The connection wiring lines CNL are electrically connected to the corresponding data lines DL via the conductive films 106. Specifically, contact holes CH-R are formed through the insulating films 103, 104, and 105 on the R connection wiring lines CNL-R. Inside the contact holes CH-R, the conductive films 106 are formed. The R connection wiring lines CNL-R and the R data lines DL-R are electrically connected to each other via the contact holes CH-R. Contact holes CH-G are formed through the insulating films 104 and 105 on the G connection wiring lines CNL-G. Inside the contact holes CH-G, the conductive films 106 are formed. The G connection wiring lines CNL-G and the G data lines DL-G are electrically connected to each other via the conductive films 106. Contact holes CH-B are formed through the insulating film 105 on the B connection wiring lines CNL-B. Inside the contact holes CH-B, the conductive films 106 are formed. The B connection wiring lines CNL-B and the B data lines DL-B are electrically connected to each other via the conductive films 106.

As described above, the R connection wiring lines CNL-R are formed in a layer which is the closest to the substrate 101. The B connection wiring lines CNL-B are formed in a layer which is the furthest from the substrate 101. The G connection wiring lines CNL-G are formed in a layer between the layers described above. The layer in which the R connection wiring lines CNL-R are formed is referred to as an R layer, the layer in which the G connection wiring lines CNL-G are formed is referred to as a G layer, and the layer in which the B connection wiring lines CNL-B are formed is referred to as a B layer. The plurality of R connection wiring lines CNL-R are formed in the same layer (R layer), the plurality of G connection wiring lines CNL-G are formed in the same layer (G layer), and the plurality of B connection wiring lines CNL-B are formed in the same layer (B layer). The R layers, the G layers, and the B layers are laminated through the insulating films 103 and 104. Specifically, the R layer and the G layer are laminated through the insulating film 103 therebetween, the G layer and the B layer are laminated through the insulating film 104 therebetween, and the R layer and the B layer are laminated through the insulating films 103 and 104 therebetween.

In FIG. 2, the R layer, the G layer, and the B layer are laminated in the stated order from the substrate 101 side. However, the order of lamination of the layers is not limited thereto. For example, the layers may be laminated in the order of the G layer, the R layer, and the B layer, or may be laminated in other orders. As described above, the connection wiring lines CNL supplied with the data signals corresponding to the respective colors are formed in layers different from each other corresponding to the respective colors on the substrate 101.

According to the configuration described above, the insulating film is interposed between the neighboring connection wiring lines present in layers different from each other. Therefore, the neighboring wirings can be prevented from coming into contact with each other. For example, the insulating film 103 is interposed between the R connection wiring lines CNL-R and the G connection wiring lines CNL-G. Therefore, the R connection wiring lines CNL-R and the G connection wiring lines CNL-G can be prevented from coming into contact with each other. Moreover, a distance between the neighboring connection wiring lines in the same layer is increased as compared with conventional configurations. Therefore, the neighboring wirings can be prevented from coming into contact with each other. For example, a distance between the neighboring R connection wiring lines CNL-R in the R layer is increased, and hence the neighboring R connection wiring lines CNL-R can be prevented from coming into contact with each other.

According to the configuration described above, layer structures of the connection wiring lines CNL corresponding to the respective colors can be made closely similar to each other. Specifically, the plurality of R connection wiring lines CNL-R are all formed in the R layer. Therefore, wiring resistances of the R connection wiring lines CNL-R can be made close to each other. Similarly, the plurality of G connection wiring lines CNL-G are all formed in the G layer, and hence wiring resistances of the G connection wiring lines CNL-G can be made close to each other. The plurality of B connection wiring lines CNL-B are all formed in the B layer, and hence wiring resistances of the B connection wiring lines CNL-B can be made close to each other. In this manner, a variation in wiring resistance between the connection wiring lines CNL corresponding to the same color can be reduced. Thus, the neighboring wirings can be prevented from coming into contact with each other, while display quality can be prevented from being lowered.

In the configuration described above, depths of the contact holes (CH-R, CH-G, and CH-B) respectively to the R layer, the G layer, and the B layer are different from each other. Therefore, the wiring resistance in the R connection wiring lines CNL-R, the wiring resistance in the G connection wiring lines CNL-G, and the wiring resistance in the B connection wiring lines CNL-B are different from each other. Therefore, a configuration of the liquid crystal display device for compensating for a voltage fluctuation due to a variation in wiring resistance between the connection wiring lines corresponding to the respective colors (layers) to further enhance the display quality is described as Configuration Examples 1-1 and 1-2.

Configuration Example 1-1

Figure 3:
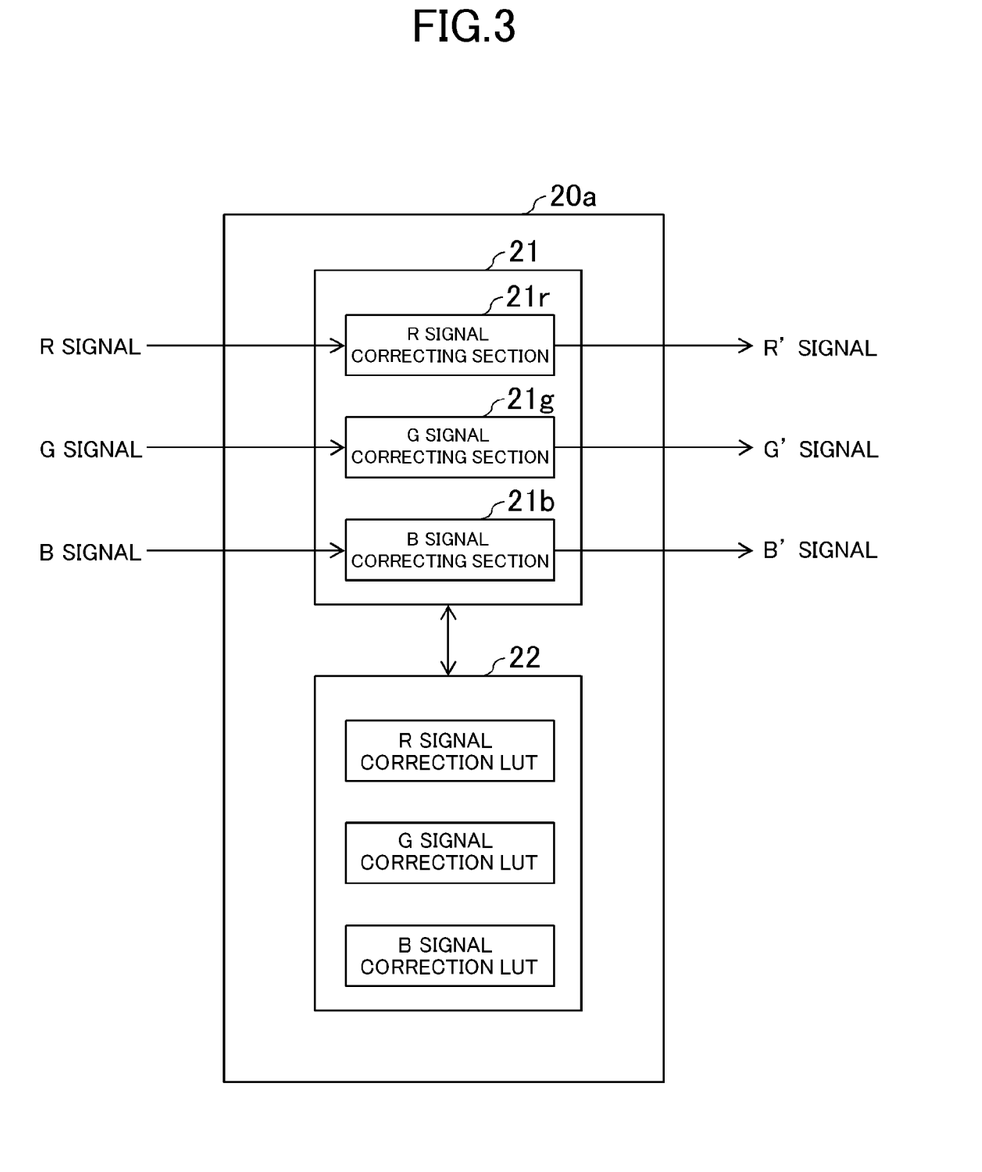
FIG. 3 is a block diagram illustrating a schematic configuration of a control circuit included in the liquid crystal display device according to Configuration Example 1-1.

FIG. 3 is a block diagram illustrating a schematic configuration of a control circuit 20a included in the liquid crystal display device 1 according to Configuration Example 1-1. The control circuit 20a includes a signal correcting unit 21 and a signal correction LUT 22. The signal correcting unit 21 receives the video signals (R signal, G signal, and B signal) from the external signal source, corrects the video signals by referring to the signal correction LUT 22, and outputs the corrected video signals (R' signal, G' signal, and B' signal) to the source drivers 12.

Specifically, the signal correcting unit 21 includes an R signal correcting section 21r, a G signal correcting section 21g, and a B signal correcting section 21b. The signal correction LUT 22 includes an R signal correction LUT, a G signal correction LUT, and a B signal correction LUT. The R signal correcting section 21r corrects the R signal input from the external signal source based on the R signal correction LUT. The G signal correcting section 21g corrects the G signal input from the external signal source based on the G signal correction LUT. The B signal correcting section 21b corrects the B signal input from the external signal source based on the B signal correction LUT.

In the signal correction LUT 22, tables (LUTs), in which the video signals and the corrected video signals are associated with each other, are stored for the respective colors. The corrected video signal stored in each of the tables is set in advance in accordance with the depth of the contact hole. For example, as for the B signal corresponding to the B layer having the smallest depth of the contact hole, a voltage value obtained by multiplying a voltage value of the video signal (B signal) by a coefficient 1.1 is set as the corrected video signal (B' signal). As for the R signal corresponding to the R layer having the largest depth of the contact hole, a voltage value obtained by multiplying a voltage value of the video signal (R signal) by a coefficient 1.3 is set as the corrected video signal (R' signal). As for the G signal corresponding to the G layer having an intermediate depth of the contact hole between those of the R layer and the B layer, a voltage value obtained by multiplying a voltage value of the video signal (G signal) by a coefficient 1.2 is set as the corrected video signal (G' signal). The voltage values of the corrected video signals are not limited to those described above. The voltage values only need to satisfy the relationship: R' signal voltage>G' signal voltage>B' signal voltage, in the same gray scale.

The control circuit 20a outputs the corrected video signals (R' signal, G' signal, and B' signal) corrected as described above to the source drivers 12. Each of the source drivers 12 outputs the data signals (gray-scale voltages; output signals) based on the corrected video signals. Specifically, each of the source drivers 12 supplies the data signals generated based on the R' signals to the R data lines DL-R through the R connection wiring lines CNL-R, supplies the data signals generated based on the G' signals to the G data lines DL-G through the G connection wiring lines CNL-G, and supplies the data signals generated based on the B' signals to the B data lines DL-B through the B connection wiring lines CNL-B.

According to the configuration described above, a correction amount (voltage increase amount) corresponding to each of the colors corrected by the signal correcting unit 21 is offset by a voltage reduction amount due to the wiring resistance in the connection wiring lines CNL corresponding to each of the colors. Specifically, it is assumed that a correction amount $\Delta V$ corrected by the R signal correcting section 21r is $\Delta Vr$ (voltage increase amount). Then, the voltage increase amount $\Delta Vr$ is offset by the voltage reduction amount due to the wiring resistance in the R connection wiring lines CNL-R. Similarly, it is assumed that a correction amount $\Delta V$ corrected by the G signal correcting section 21g is $\Delta Vg$ (voltage increase amount). Then, the voltage increase amount $\Delta Vg$ is offset by the voltage reduction amount due to the wiring resistance in the G connection wiring lines CNL-G. It is assumed that a correction amount $\Delta V$ corrected by the B signal correcting section 21b is $\Delta Vb$ (voltage increase amount). Then, the voltage increase amount $\Delta Vb$ is offset by the voltage reduction amount due to the wiring resistance in the B connection wiring lines CNL-B.

As described above, the voltage drop due to the wiring resistance can be compensated for by the correction of the video signals. Therefore, desired display quality in accordance with the input video signals can be obtained on a displayed image. The configuration of the present application is not limited to that for perfectly compensating for the voltage drop due to the wiring resistance. Any configuration may be used as long as the voltage fluctuation due to the variation in wiring resistance between the connection wiring lines corresponding to the respective colors (layers) can be reduced.

FIG. 3 illustrates the configuration of the control circuit 20 in which the signal correction unit 21 corrects the video signals by referring to the signal correction LUT 22. However, the configuration of the control circuit 20 is not limited thereto. For example, the control circuit 20 may have a configuration in which the signal correcting sections 21r, 21g, and 21b each have a computing function and multiply the input video signals by the coefficients described above to calculate and output the corrected video signals.

Configuration Example 1-2

Figure 4:
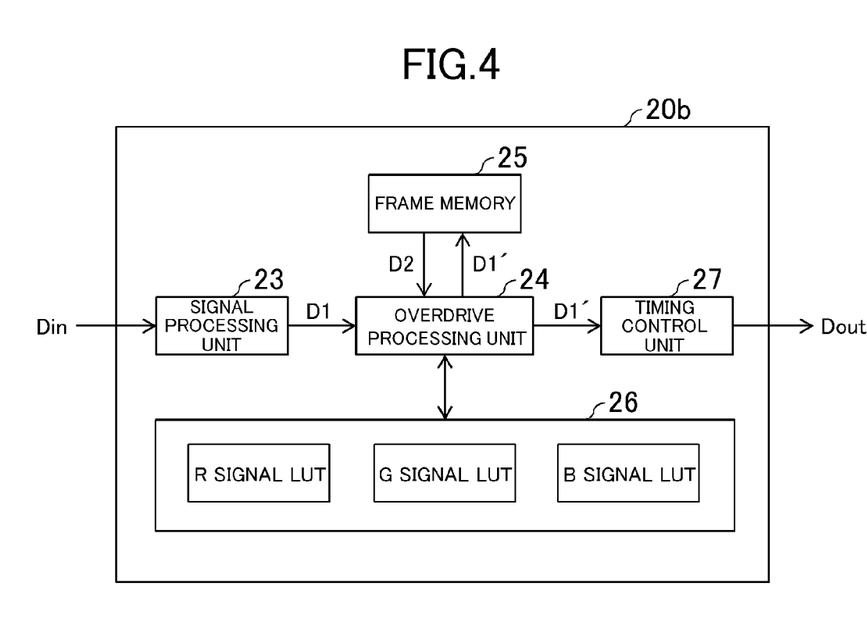
FIG. 4 is a block diagram illustrating a schematic configuration of a control circuit included in the liquid crystal display device according to Configuration Example 1-2.

So-called overdrive for correcting the gray scale of the input video signal in an enhanced manner is performed for the liquid crystal display device 1 according to Configuration Example 1-2. As a configuration of the control circuit for performing the overdrive, a known configuration can be used. An example thereof is described below. FIG. 4 is a block diagram illustrating a configuration example of a control circuit 20b included in the liquid crystal display device 1 according to Configuration Example 1-2.

The control circuit 20b includes a signal processing unit 23, an overdrive processing unit 24, a frame memory 25, an overdrive LUT 26, and a timing control unit 27. In response to a video signal Din (R signal, G signal, and B signal) input from the external signal source, the control circuit 20b outputs a corrected video signal Dout (R' signal, G' signal, and B' signal) which is obtained by performing correction processing for enhancing the gray scale on the input video signal Din.

The signal processing unit 23 performs predetermined signal processing on the input video signal Din and supplies a video signal D1 to the overdrive processing unit 24. The signal processing unit 23 also generates various types of timing control signals for driving the gate driver 11 and the source drivers 12 and supplies the timing control signals to the gate driver 11 and the source drivers 12.

The overdrive processing unit 24 performs gray-scale correction on the video signal D1 of a current frame based on the video signal D1 of the current frame, which is supplied from the signal processing unit 23, and a video signal D2 of a preceding frame (frame just before the current frame) stored in the frame memory 25. The overdrive processing unit 24 writes (stores) a corrected video signal D1' after the correction in the frame memory 25 and also supplies the corrected video signal D1' to the timing control unit 27. The gray-scale correction processing for the video signal D1 of the current frame is performed referring to the table (overdrive LUT 26) in which a gray scale of the video signal D1 of the current frame, a gray scale of the video signal D2 of the preceding frame, and a gray scale of the corrected video signal D1' of the current frame are associated with each other. The overdrive LUT 26 includes an R signal LUT, a G signal LUT, and a B signal LUT.

Figure 5:
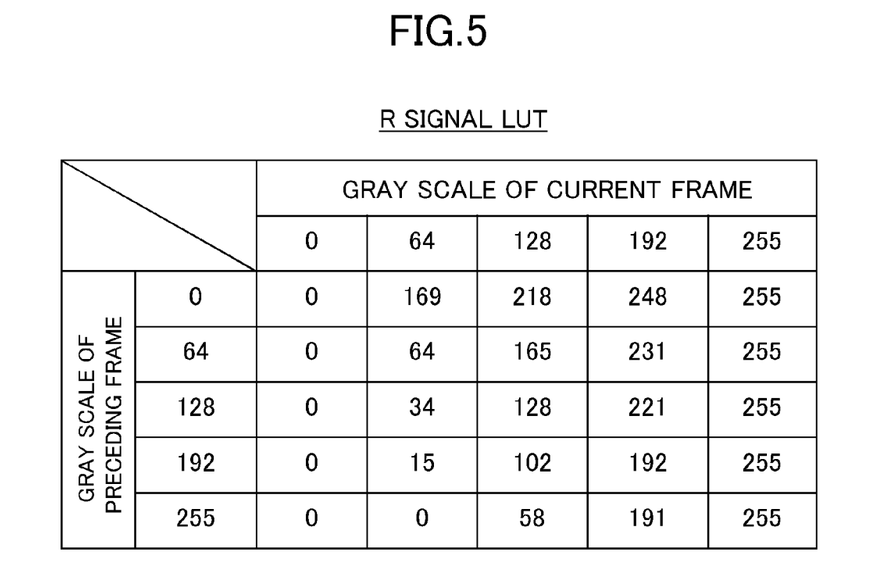
FIG. 5 is a table showing an example of an R signal LUT.
Figure 6:
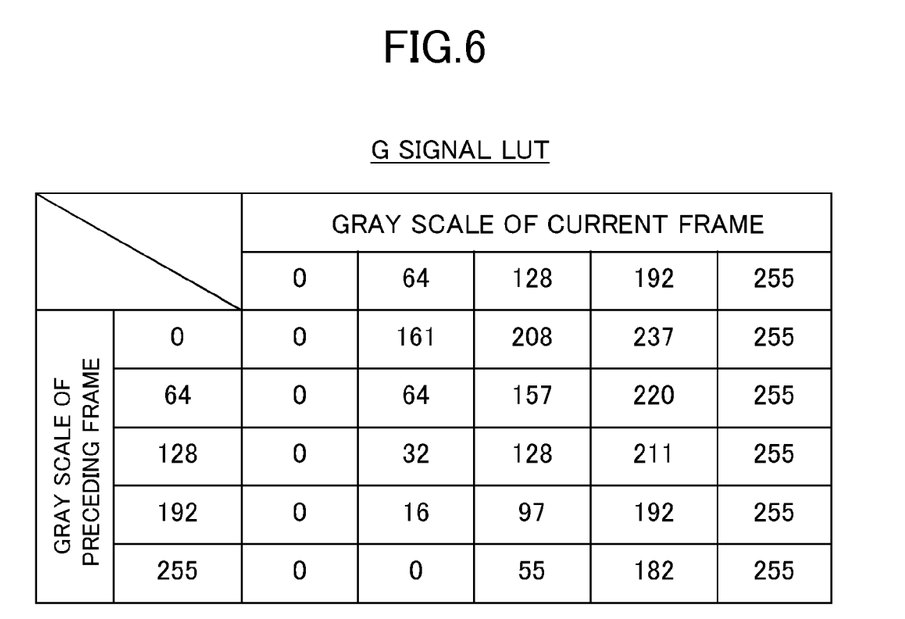
FIG. 6 is a table showing an example of a G signal LUT.

FIG. 5 is a table showing an example of the R signal LUT. As shown in FIG. 5, representative values of the gray scale of the input video signal D1 of the current frame (current gray scale) and representative values of the gray scale of the input video signal D2 of the preceding frame (preceding gray scale) are arranged in a matrix pattern in the R signal LUT. Gray scales of the corrected video signal D1' of the current frame (corrected gray scales), which correspond to the intersections of the representative values, are stored in the R signal LUT. As the representative values of the gray scales, 0, 64, 128, 192, and 255 are shown in FIG. 5. As the corrected gray scale, when a change from the preceding gray scale to the current gray scale (gray-scale transition) is a rising change (rise response), the gray scale is set larger than the current gray scale. On the other hand, when the gray-scale transition is a decaying change (decay response), the gray scale is set smaller than the current gray scale. FIG. 6 shows an example of the G signal LUT, whereas FIG. 7 shows an example of the B signal LUT.

Figure 7:
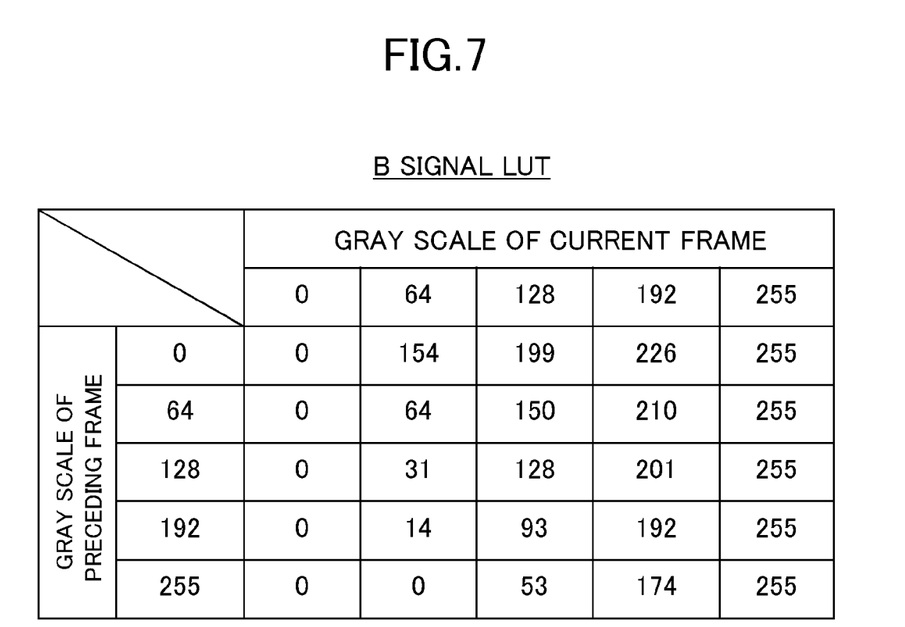
FIG. 7 is a table showing an example of a B signal LUT.

Moreover, as shown in FIGS. 5 to 7, the corrected gray scales of the signals corresponding to the respective colors are set so as to satisfy the relationship: R signal corrected gray scale>G signal corrected gray scale>B signal corrected gray scale in accordance with the depths of the contact holes in a region in which a gray-scale transition amount is large.

As described above, the frame memory 25 stores the corrected video signals D1' after the correction by the overdrive processing unit 24 as the video signals D2 in a frame unit.

The timing control unit 27 outputs the corrected video signals D1' (R' signal, G' signal, and B' signal) supplied from the overdrive processing unit 24 to the source drivers 12 as the video signals Dout in accordance with the timing control signal generated by the signal processing unit 23.

Each of the source drivers 12 outputs the data signals (gray-scale voltages; output signals) based on the video signals Dout. Specifically, each of the source drivers 12 supplies the data signals generated based on the R' signals to the R data lines DL-R through the R connection wiring lines CNL-R, supplies the data signals generated based on the G' signals to the G data lines DL-G through the G connection wiring lines CNL-G, and supplies the data signals generated based on the B' signals to the B data lines DL-B through the B connection wiring lines CNL-B. According to the liquid crystal display device 1 of Configuration Example 1-2, the same effects as those of the liquid crystal display device 1 according to Configuration Example 1-1 can be obtained.

Second Embodiment

A liquid crystal display device 2 according to a second embodiment of the present application is now described. For convenience of the description, elements having the same functions as those of the elements described in the first embodiment are denoted by the same reference symbols, and the description thereof is herein omitted. Moreover, the terms which are defined in the first embodiment are used in the second embodiment in accordance with the definitions unless otherwise noted.

A planar configuration of the liquid crystal display device 2 is the same as that of the liquid crystal display device 1 according to the first embodiment (see FIG. 1). The liquid crystal display device 2 differs from the liquid crystal display device 1 in the sectional structure of the display panel including connection wiring lines and the configuration (functions) of the control circuit. In the following, differences from the liquid crystal display device 1 are mainly described.

Figure 8:
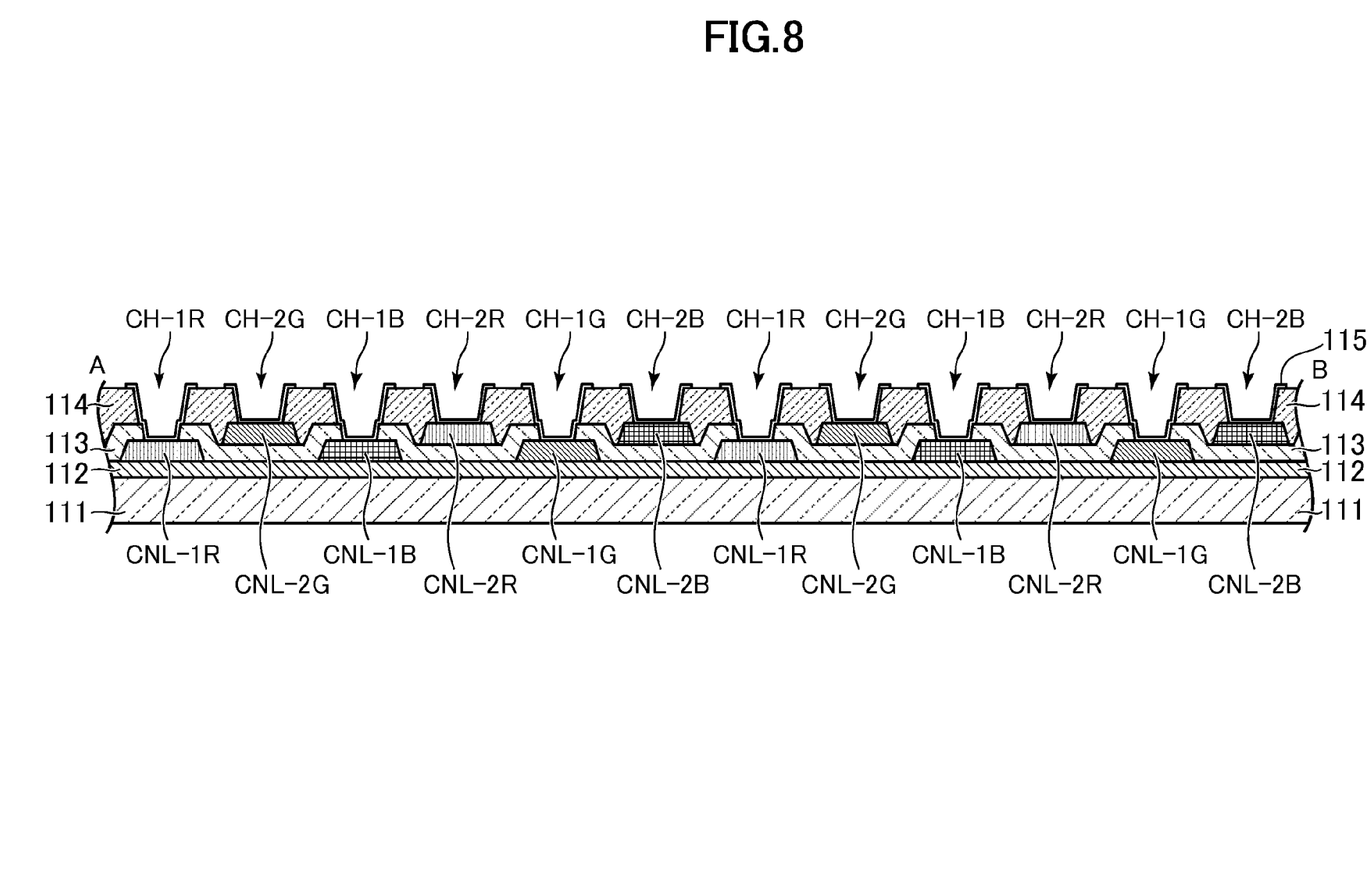
FIG. 8 is a diagram illustrating a part of a sectional structure of a display panel of a liquid crystal display device according to a second embodiment of the present application, which is taken along the line A-B in FIG. 1.

FIG. 8 illustrates a part of a cross section of the display panel 10 of the liquid crystal display device 2 taken along the line A-B in FIG. 1. As illustrated in FIG. 8, in the display panel 10, an insulating film (insulating layer) 112 is formed on a substrate 111. On the insulating film 112, first R connection wiring lines CNL-1R, first G connection wiring lines CNL-1G, and first B connection wiring lines CNL-1B are formed. An insulating film (insulating layer) 113 is formed so as to cover the first R connection wiring lines CNL-1R, the first G connection wiring lines CNL-1G, and the first B connection wiring lines CNL-1B. On the insulating film 113, second R connection wiring lines CNL-2R, second G connection wiring lines CNL-2G, and second B connection wiring lines CNL-2B are formed. An insulating film 114 (insulating layer) is formed so as to cover the second R connection wiring lines CNL-2R, the second G connection wiring lines CNL-2G, and the second B connection wiring lines CNL-2B.

On the insulating films on the connection wiring lines CNL, contact holes reaching the respective connection wiring lines CNL are formed. A conductive film 115 is formed in each of the contact holes. The connection wiring lines CNL are electrically connected to the corresponding data lines DL via the conductive films 115. Specifically, contact holes CH-1R, CH-1G, and CH-1B are respectively formed through the insulating films 113 and 114 on the first R connection wiring lines CNL-1R, the first G connection wiring lines CNL-1G, and the first B connection wiring lines CNL-1B. Inside the contact holes CH-1R, CH-1G, and CH-1B, the conductive films 115 are formed. Through the conductive films 115, the first R connection wiring lines CNL-1R and the R data lines DL-R are electrically connected to each other. Similarly, the first G connection wiring lines CNL-1G and the G data lines DL-G are electrically connected to each other, whereas the first B connection wiring lines CNL-1B and the B data lines DL-B are electrically connected to each other. Moreover, contact holes CH-2R, CH-2G, and CH-2B are formed through the insulating film 114 on the second R connection wiring lines CNL-2R, the second G connection wiring lines CNL-2G, and the second B connection wiring lines CNL-2B. Inside the contact holes CH-2R, CH-2G, and CH-2B, the conductive films 115 are formed. Through the conductive films 115, the second R connection wiring lines CNL-2R and the R data lines DL-R are electrically connected to each other. Similarly, the second G connection wiring lines CNL-2G and the G data lines DL-G are electrically connected to each other, whereas the second B connection wiring lines CNL-2B and the B data lines DL-B are electrically connected to each other.

As described above, in the display panel 10 of the liquid crystal display device 2, the neighboring two connection wiring lines CNL are formed in layers different from each other. Specifically, the connection wiring lines corresponding to each of the colors are classified as the first connection wiring lines CNL-1 and the second connection wiring lines CNL-2. Then, the first connection wiring lines CNL-1 and the second connection wiring lines CNL-2 are formed in layers different from each other. The first connection wiring lines CNL-1 are formed in the lower layer on the side closer to the substrate 111, whereas the second connection wiring lines CNL-2 are formed in the upper layer on the first connection wiring lines CNL-1 through the insulating film 113 therebetween.

According to the configuration described above, the insulating film is interposed between the neighboring connection wiring lines in layers different from each other. Therefore, the neighboring wirings can be prevented from coming into contact with each other. For example, the insulating film 113 is interposed between the first R connection wiring lines CNL-1R and the second G-connection wiring lines CNL-2G. Therefore, the connection wiring lines described above can be prevented from coming into contact with each other. Moreover, a distance between the neighboring connection wiring lines in the same layer is increased. Therefore, the neighboring wirings can be prevented from coming into contact with each other. For example, distances between the first R connection wiring lines CNL-1R, the first G connection wiring lines CNL-1G, and the first B connection wiring lines CNL-1B which neighbor each other in the lower layer are increased. Therefore, the connection wiring lines described above can be prevented from coming into contact with each other.

In the configuration described above, depths of the contact holes (CH-1 and CH-2) respectively to the lower layer on which the first connection wiring lines CNL-1 are formed and the upper layer on which the second connection wiring lines CNL-2 are formed are different from each other. Therefore, the wiring resistance in the first connection wiring lines CNL-1 and the wiring resistance in the second connection wiring lines CNL-2 are different from each other. Therefore, a configuration of the liquid crystal display device for compensating for a voltage fluctuation due to a variation in wiring resistance between the connection wiring lines of the different layers to further enhance the display quality is described as Configuration Examples 2-1 and 2-2.

Configuration Example 2-1

Figure 9:
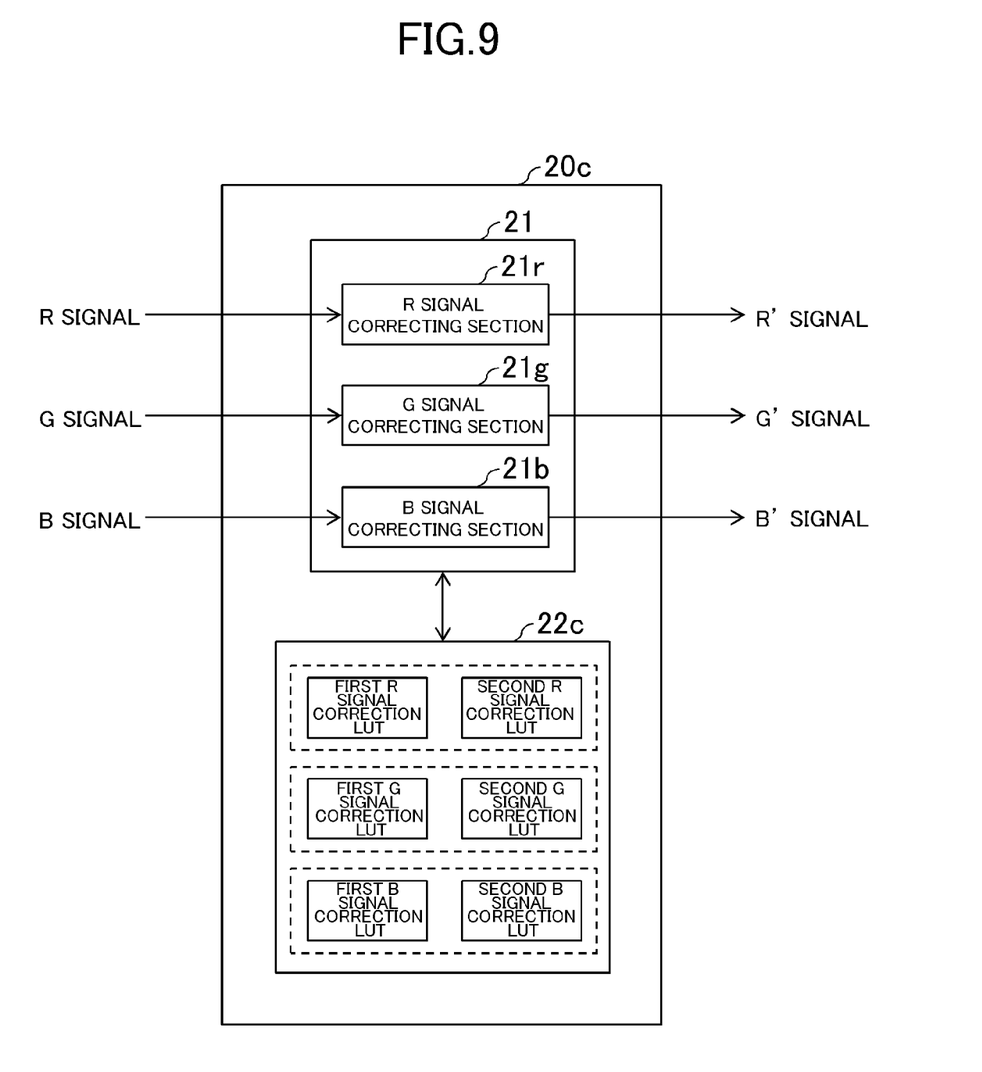
FIG. 9 is a block diagram illustrating a schematic configuration of a control circuit included in the liquid crystal display device according to Configuration Example 2-1.

FIG. 9 is a block diagram illustrating a schematic configuration of a control circuit 20c included in the liquid crystal display device 2 according to Configuration Example 2-1. The control circuit 20c includes a signal correcting unit 21 and a signal correction LUT 22c. The signal correcting unit 21 receives the video signals (R signal, G signal, and B signal) from the external signal source, corrects the video signals by referring to the signal correction LUT 22c, and outputs the corrected video signals (R' signal, G' signal, and B' signal).

Specifically, the signal correcting unit 21 includes an R signal correcting section 21r, a G signal correcting section 21g, and a B signal correcting section 21b. The signal correction LUT 22c includes a first R signal correction LUT, a second R signal correction LUT, a first G signal correction LUT, a second G signal correction LUT, a first B signal correction LUT, and a second B signal correction LUT. The R signal correcting section 21r corrects a first R signal corresponding to the first R connection wiring lines CNL-1R, which are input from the external signal source, based on the first R signal correction LUT, and a second R signal corresponding to the second R connection wiring lines CNL-2R, which are input from the external signal source, based on the second R signal correction LUT. Further, the G signal correcting section 21g corrects a first G signal corresponding to the first G connection wiring lines CNL-1G, which are input from the external signal source, based on the first G signal correction LUT, and a second G signal corresponding to the second G connection wiring lines CNL-2G, which are input from the external signal source, based on the second G signal correction LUT. Further, the B signal correcting section 21b corrects a first B signal corresponding to the first B connection wiring lines CNL-1B, which are input from the external signal source, based on the first B signal correction LUT, and a second B signal corresponding to the second B connection wiring lines CNL-2B, which are input from the external signal source, based on the second B signal correction LUT.

The signal correction LUT 22c stores tables (LUTs) corresponding to the respective colors and the layers in which the connection wiring lines CNL are provided (formed). In each of the tables, the video signals and the corrected video signals are associated with each other. The corrected video signals stored in each of the tables are set in advance in accordance with the depths of the contact holes. For example, as for the video signal corresponding to the second connection wiring line CNL-2 provided in the upper layer having the contact hole with the smaller depth, a voltage value obtained by multiplying a voltage value of the video signal by a coefficient 1.1 is set as the corrected video signal. As for the video signal corresponding to the first connection wiring line CNL-1 provided in the lower layer having the contact hole with the larger depth, a voltage value obtained by multiplying a voltage value of the video signal by a coefficient 1.2 is set as the corrected video signal.

The control circuit 20c outputs the corrected video signals (first R' signal and second R' signal, first G' signal and second G' signal, and first B' signal and second B' signal) corrected as described above to the source drivers 12. Each of the source drivers 12 outputs the data signals (gray-scale voltages; output signals) based on the corrected video signals. Specifically, each of the source drivers 12 supplies the data signals generated based on the first R' signals to the R data lines DL-R through the first R connection wiring lines CNL-1R, and supplies the data signals generated based on the second R' signals to the R data lines DL-R through the second R connection wiring lines CNL-2R. Each of the source drivers 12 supplies the data signals generated based on the first G' signals to the G data lines DL-G through the first G connection wiring lines CNL-1G and supplies the data signals generated based on the second G' signals to the G data lines DL-G through the second G connection wiring lines CNL-2G. Further, each of the source drivers 12 supplies the data signals generated based on the first B' signals to the B data lines DL-B through the first B connection wiring lines CNL-1B and supplies the data signals generated based on the second B' signals to the B data lines DL-B through the second B connection wiring lines CNL-2B.

As described above, in the liquid crystal display device 2 according to the second embodiment, the signal correcting unit 21 has the configuration of correcting the video signal in accordance with the position of the layer in which the connection wiring lines CNL corresponding to the respective colors are provided. Further, the signal correcting unit 21 sets a correction amount for the video signals corresponding to the first connection wiring lines and a correction amount for the video signals corresponding to the second connection wiring lines different from each other in accordance with the positions of the layers.

According to the configuration described above, a correction amount (voltage increase amount) corresponding to each of the colors and each of the layers corrected by the signal correcting unit 21 is offset by a voltage reduction amount due to the wiring resistance in the connection wiring lines CNL corresponding to each of the colors and each of the layers. Specifically, it is assumed that a correction amount $\Delta V$ with respect to the first R signal corrected by the R signal correcting section 21r is $\Delta Vr1$ (voltage increase amount). Then, the voltage increase amount $\Delta Vr1$ is offset by the voltage reduction amount due to the wiring resistance in the first R connection wiring lines CNL-1R. Similarly, it is assumed that a correction amount $\Delta V$ with respect to the second R signal corrected by the R signal correcting section 21r is $\Delta Vr2$ (voltage increase amount). Then, the voltage increase amount $\Delta Vr2$ is offset by the voltage reduction amount due to the wiring resistance in the second R connection wiring lines CNL-2R.

As described above, the voltage drop due to the wiring resistance can be compensated for by the correction of the video signals. Therefore, desired display quality in accordance with the input video signals can be obtained on a displayed image. The configuration of the present application is not limited to that for perfectly compensating for the voltage drop due to the wiring resistance. Any configuration may be used as long as the voltage fluctuation due to the variation in wiring resistance between the connection wiring lines can be reduced.

FIG. 9 illustrates the configuration of the control circuit 20 in which the signal correction unit 21 corrects the video signals by referring to the signal correction LUT 22c. However, the configuration of the control circuit 20 of this embodiment is not limited thereto. For example, the control circuit 20 may have a configuration in which the signal correcting sections 21r, 21g, and 21b each have a computing function and multiply the input video signals by the coefficients described above to calculate and output the corrected video signals.

Configuration Example 2-2

Figure 10:
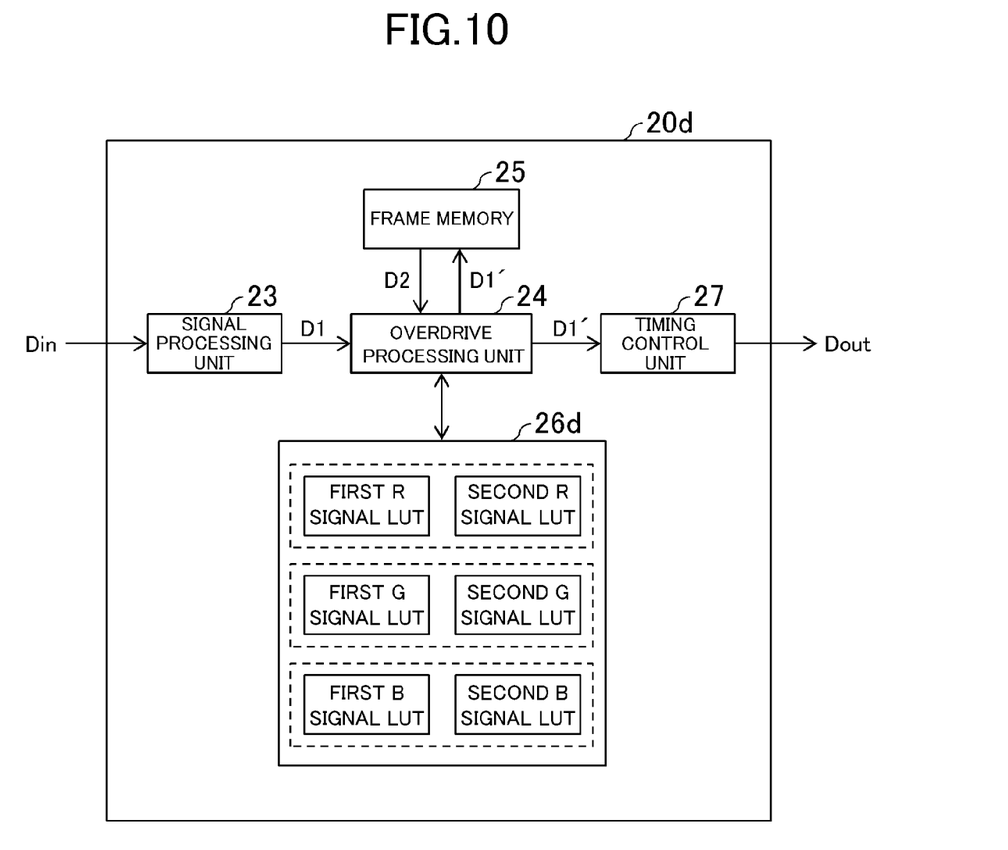
FIG. 10 is a block diagram illustrating a schematic configuration of a control circuit included in the liquid crystal display device according to Configuration Example 2-2.

So-called overdrive for correcting the gray scale of the input video signal in an enhanced manner is performed for the liquid crystal display device 2 according to Configuration Example 2-2. As a configuration of the control circuit for performing the overdrive, a known configuration can be used. An example thereof is described below. FIG. 10 is a block diagram illustrating a configuration example of a control circuit 20d included in the liquid crystal display device 2 according to Configuration Example 2-2.

The control circuit 20d includes a signal processing unit 23, an overdrive processing unit 24, a frame memory 25, an overdrive LUT 26d, and a timing control unit 27. Differences from the control circuit 20b (see FIG. 4) of Configuration Example 1-2 are mainly described below.

The overdrive LUT 26d includes a first R signal LUT, a second R signal LUT, a first G signal LUT, a second G signal LUT, a first B signal LUT, and a second B signal LUT.

Figure 11:
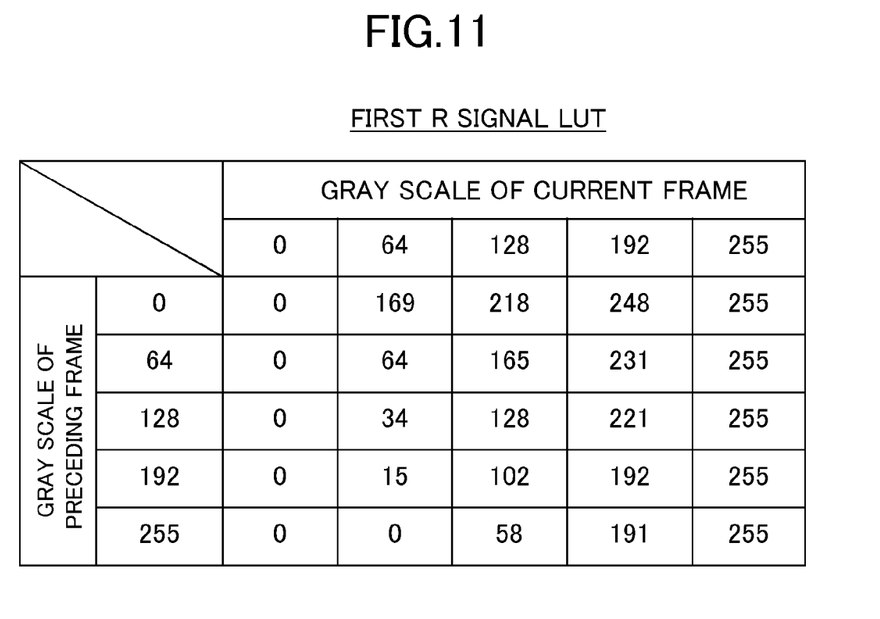
FIG. 11 is a table showing an example of a first R signal LUT.
Figure 12:
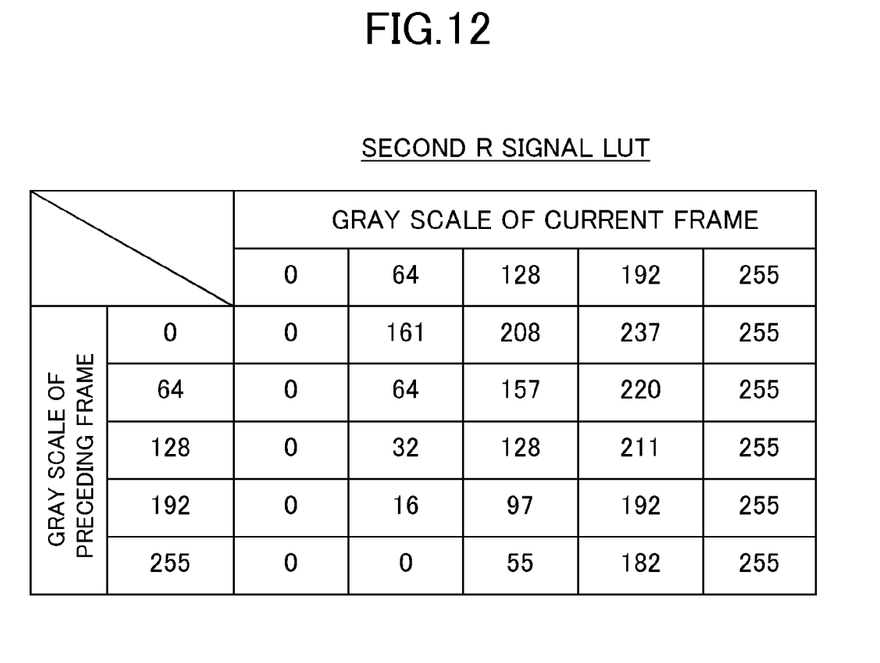
FIG. 12 is a table showing an example of a second R signal LUT.

FIG. 11 is a table showing an example of the first R signal LUT, and FIG. 12 is a table showing an example of the second R signal LUT. As shown in FIGS. 11 and 12, a corrected gray scale of the R signal is set so as to satisfy the relationship: first R signal corrected gray scale>second R signal corrected gray scale in accordance with the position of the layer (depth of the contact hole CH-R) in which the R connection wiring line CNL-R is provided, in a region in which the gray-scale transition amount is large. Although the illustration of the first G signal LUT, the second G signal LUT, the first B signal LUT, and the second B signal LUT is omitted, the corrected gray scale of the G signal and the corrected gray scale of the B signal are set similarly. Specifically, the corrected gray scale of the G signal is set so as to satisfy the relationship: first G signal corrected gray scale>second G signal corrected gray scale in the region in which the gray-scale transition amount is large, whereas the corrected gray scale of the B signal is set so as to satisfy the relationship: first B signal corrected gray scale>second B signal corrected gray scale in the region in which the gray-scale transition amount is large.

The overdrive processing unit 24 corrects the gray scale for the video signal D1 of the current frame by referring to the overdrive LUT 26d. Then, the overdrive processing unit 24 writes (stores) the corrected video signal D1' after the correction in the frame memory 25 and supplies the corrected video signal D1' to the timing control unit 27.

The timing control unit 27 outputs the corrected video signals D1' (first R' signal and second R' signal, first G' signal and second G' signal, and first B' signal and second B' signal) supplied from the overdrive processing unit 24 to the source drivers 12 as the video signals Dout in accordance with the timing control signal generated in the signal processing unit 23.

Each of the source drivers 12 outputs the data signals (gray-scale voltages; output signals) based on the video signals Dout. Specifically, each of the source drivers 12 supplies the data signals generated based on the first R' signals to the R data lines DL-R through the first R connection wiring lines CNL-1R and supplies the data signals generated based on the second R' signals to the R data lines DL-R through the second R connection wiring lines CNL-2R. Further, each of the source drivers 12 supplies the data signals generated based on the first G' signals to the G data lines DL-G through the first G connection wiring lines CNL-1G and supplies the data signals generated based on the second G' signals to the G data lines DL-G through the second G connection wiring lines CNL-2G. Further, each of the source drivers 12 supplies the data signals generated based on the first B' signals to the B data lines DL-B through the first B connection wiring lines CNL-1B and supplies the data signals generated based on the second B' signals to the B data lines DL-B through the second B connection wiring lines CNL-2B.

According to the liquid crystal display device 2 of Configuration Example 2-2, the same effects as those obtained by the liquid crystal display device 2 of Configuration Example 2-1 can be obtained.

The present application is not limited to the embodiments described above. For example, when the video signal is of an RGBW system (or RGBY system), a plurality of connection wiring lines to be supplied with output signals corresponding to the respective colors may be formed in layers different from each other corresponding to the respective colors to provide a four-layer structure. Alternatively, a double-layer structure may be provided in the following manner. Specifically, an R layer including R connection wiring lines and a B layer including B connection wiring lines are provided in a lower layer, whereas a G layer including G connection wiring lines and a W layer (or Y layer) including W connection wiring lines (or Y connection wiring lines) are provided in an upper layer. By performing the signal correction processing described above in each of the structures, the neighboring wirings can be prevented from coming into contact with each other, while the display quality can be prevented from being lowered. The alphabet letter "W" corresponds to white, and the alphabet letter "Y" corresponds to yellow.

According to the configurations of the display device of the embodiments described above, the layer structures including the connection wiring lines corresponding to the respective colors can be made closely similar to each other. Therefore, a variation in wiring resistance between the connection wiring lines corresponding to the respective colors can be reduced. Thus, the neighboring wirings can be prevented from coming into contact with each other, while the display quality can be prevented from being lowered.

While there have been described what are at present considered to be certain embodiments of the application, it will be understood that various modifications may be made thereto, and it is intended that the appended claims cover all such modifications as fall within the true spirit and scope of the invention.

What is claimed is:

1. A display device, comprising:
   a drive circuit for inputting input signals generated based on video signals corresponding to at least red, green, and blue input from an exterior of the display device; and
   a substrate including a plurality of connection wiring lines and a plurality of signal lines formed thereon,
      the plurality of connection wiring lines being connected to the drive circuit and being provided in a region outside a display region,
      the plurality of signal lines being provided in the display region, to which output signals output from the drive circuit are input through the plurality of connection wiring lines,
   wherein the plurality of connection wiring lines supplied with the output signals corresponding to the respective colors are formed in layers different from each other corresponding to the respective colors on the substrate,
   wherein the display device comprises:
      an R layer in which the plurality of connection wiring lines to be supplied with the output signal corresponding to red are formed;
      a G layer in which the plurality of connection wiring lines to be supplied with the output signal corresponding to green are formed; and
      a B layer in which the plurality of connection wiring lines to be supplied with the output signal corresponding to blue are formed,
   wherein the R layer, the G layer, and the B layer are laminated through insulating layers therebetween,
   wherein the plurality of signal lines are respectively connected to the plurality of connection wiring lines via contact holes formed through the insulating layers, and
   wherein the respective contact holes to the R layer, the G layer and the B layer have different depths with respect to each other.

2. The display device according to claim 1, further comprising correcting section for correcting the video signals in accordance with positions of layers in which the plurality of connection wiring lines to be supplied with the output signals corresponding to the respective colors are provided,
   wherein signals corrected by the correcting section are input to the drive circuit as the input signals.

3. The display device according to claim 2, wherein the correcting section sets a correction amount for the video signals larger when corresponding one of the positions of the layers in which corresponding ones of the plurality of connection wiring lines are provided is closer to the substrate.

4. The display device according to claim 2, wherein the correcting section performs correction for enhancing a gray scale corresponding to each of the video signals.

5. The display device according to claim 1, wherein a first layer of an R layer or a G layer or a B layer is located above and directly contacting an adjacent insulating layer,
   wherein said first layer of said R layer or G layer or B layer is located above a second layer of an R layer or G layer or B layer when said display device has an orientation where the substrate is in a lower position than each of said R layer, G layer and B layers.

6. The display device according to claim 1, wherein a first insulating layer is directly contacting two of said R, G or B layers.

7. The display device according to claim 6, wherein a second insulating layer is directly contacting two of said R, G or B layers.

8. A display device, comprising:
   a drive circuit for inputting input signals generated based on video signals corresponding to at least red, green, and blue input from an exterior of the display device; and
   a substrate including a plurality of connection wiring lines and a plurality of signal lines formed thereon,
      the plurality of connection wiring lines being connected to the drive circuit,
      the plurality of signal lines being provided in a display region, to which output signals output from the drive circuit are input through the plurality of connection wiring lines,
   wherein neighboring two of the plurality of connection wiring lines are formed in layers different from each other on the substrate,
   wherein the display device further comprises correcting section for correcting the video signals in accordance with positions of layers in which the plurality of connection wiring lines to be supplied with the output signals corresponding to the respective colors are provided, and wherein signals corrected by the correcting section are input to the driving circuit as the input signals, wherein the plurality of connection wiring lines corresponding to the respective colors are classified as first connection wiring lines and second connection wiring lines to be formed in layers different from each other, and wherein the correcting section sets a correction amount for the video signals corresponding to the first connection wiring lines and a correction amount for the video signals corresponding to the second connection wiring lines different from each other, wherein the first connection wiring lines are formed in a lower layer on a side closer to the substrate and the second connection wiring lines are formed in an upper layer on the first connection wiring lines through an insulating layer therebetween, wherein the plurality of connection wiring lines corresponding to red are classified as first R connection wiring lines formed in the lower layer and second R connection wiring lines formed in the upper layer, wherein the plurality of connection wiring lines corresponding to green are classified as first G connection wiring lines formed in the lower layer and second G connection wiring lines formed in the upper layer, wherein the plurality of connection wiring lines corresponding to blue are classified as first B connection wiring lines formed in the lower layer and second B connection wiring lines formed in the upper layer, and wherein the correcting section sets a correction amount for the video signals of red corresponding to the first R connection wiring lines larger than a correction amount for the video signals of red corresponding to the second R connection wiring lines, sets a correction amount for the video signals of green corresponding to the first G connection wiring lines larger than a correction amount for the video signals of green corresponding to the second G connection wiring lines, and sets a correction amount for the video signals of blue corresponding to the first B connection wiring lines larger than a correction amount for the video signals of blue corresponding to the second B connection wiring lines.

9. The display device according to claim 8, wherein the correcting section performs correction for enhancing a gray scale corresponding to each of the video signals.

\* \* \* \* \*